United States Patent
Derneryd et al.

(10) Patent No.: US 9,847,573 B2
(45) Date of Patent: Dec. 19, 2017

(54) METHOD FOR ANTENNA ALIGNMENT IN A NON LINE-OF-SIGHT SCENARIO

(71) Applicant: TELEFONAKTIEBOLAGET L M ERICSSON (PUBL), Stockholm (SE)

(72) Inventors: Anders Derneryd, Göteborg (SE); Jan-Erik Berg, Sollentuna (SE); Ulrika Engström, Floda (SE); Lars Manholm, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 145 days.

(21) Appl. No.: 14/764,837

(22) PCT Filed: Feb. 1, 2013

(86) PCT No.: PCT/EP2013/052004
§ 371 (c)(1),
(2) Date: Jul. 30, 2015

(87) PCT Pub. No.: WO2014/117857
PCT Pub. Date: Aug. 7, 2014

(65) Prior Publication Data
US 2015/0364818 A1  Dec. 17, 2015

(51) Int. Cl.
*H01Q 3/26* (2006.01)
*H04B 7/08* (2006.01)
(Continued)

(52) U.S. Cl.
CPC .............. *H01Q 3/26* (2013.01); *G01S 3/38* (2013.01); *G01S 7/003* (2013.01); *G01S 17/88* (2013.01); *H01Q 3/2605* (2013.01); *H04B 7/086* (2013.01)

(58) Field of Classification Search
CPC ..... G01S 3/14; G01S 3/16; G01S 3/38; G01S 3/40; G01S 3/58; H04W 16/24;
(Continued)

(56) References Cited

U.S. PATENT DOCUMENTS 5,051,753 A * 9/1991 Haruyama .......... G01S 13/4409
342/158
6,498,939 B1 * 12/2002 Thomas ............... H04B 7/0408
455/279.1
(Continued)

FOREIGN PATENT DOCUMENTS

EP         1659813 A1    5/2006
WO      2008047342 A2    4/2008
WO      2011114412 A1    9/2011

*Primary Examiner* — Frank J McGue
*Assistant Examiner* — Daniel P Malley, Sr.
(74) *Attorney, Agent, or Firm* — Rothwell, Figg, Ernst & Manbeck, P.C.

(57) ABSTRACT

A method for alignment of a first node with a second node in a wireless communication network. The method comprises directing a first node first antenna beam at a first pointing angle, using a second node antenna beam for scanning a first volume with objects being able to generate signal reflections/diffraction, detecting a first signal property of reflected/diffracted signals; and saving scan angles resulting in said first signal property exceeding a first threshold level. The method further comprises directing the second node antenna beam at said saved angles, and, for each such angle: using a first node second antenna beam for scanning; and detecting at least a second signal property of reflected/diffracted signals; exchanging information between the nodes comprising first node second antenna beam pointing direction angles resulting in said second signal property exceeding a second threshold level and said saved angles; and selecting angles for communication.

7 Claims, 4 Drawing Sheets

(51) Int. Cl.
*G01S 17/88* (2006.01)
*G01S 3/38* (2006.01)
*G01S 7/00* (2006.01)

(58) Field of Classification Search
CPC ...... H04W 16/26; H04W 16/28; H04B 7/022;
H04B 7/04; H04B 7/0408; H04B 7/15514
See application file for complete search history.

(56) References Cited

U.S. PATENT DOCUMENTS

| | | |
|---|---|---|
| 6,836,675 B2 | 12/2004 | Zhang |
| 2003/0048770 A1* | 3/2003 | Proctor, Jr. .......... H01Q 3/2605 370/349 |
| 2004/0224637 A1* | 11/2004 | Silva .................... H04B 7/04 455/63.4 |
| 2005/0233752 A1 | 10/2005 | Laroia et al. |
| 2006/0116092 A1* | 6/2006 | Uno .................... H04B 7/0408 455/134 |
| 2010/0302101 A1 | 12/2010 | Leiba et al. |
| 2011/0110453 A1* | 5/2011 | Prasad ................ H04B 7/0695 375/285 |
| 2013/0002487 A1* | 1/2013 | Hosoya ............... H04B 7/0617 342/372 |

* cited by examiner

METHOD FOR ANTENNA ALIGNMENT IN A NON LINE-OF-SIGHT SCENARIO

CROSS REFERENCE TO RELATED APPLICATION(S)

This application is a 35 U.S.C. §371 National Phase Entry Application from PCT/EP2013/052004, filed Feb. 1, 2013, designating the United States, the disclosure of which is incorporated herein in its entirety by reference.

TECHNICAL FIELD

The present invention relates to a method for alignment of a first node with a second node in a wireless communication network. For a first alignment mode, the method comprises the step of directing a first node first antenna beam at a first pointing direction angle.

BACKGROUND

It is desired to acquire a high degree of capacity in wireless communication networks. One technique to increase capacity in a wireless communication network is to deploy low power pico radio base stations within macro cell coverage areas forming a heterogeneous network. Pico base stations are smaller than regular macro base stations, and cover smaller areas, and are in many cases placed close to street level and a backhaul aggregation point is usually placed at macro base stations above rooftop level.

Traditional backhaul technologies for establishing a connection between pico base stations and a backhaul aggregation point are line-of-sight radio links. However, when the backhaul aggregation points are placed above rooftop level while the pico base stations are below the roof, closer to the street level, line-of-sight (LOS) may be prevented such that a none line-of-sight (NLOS) scenario exists. Then, one cannot align the radio link backhaul antenna beams at the macro base station and the radio link backhaul antenna beam at the pico base station towards each other by means of visual inspection and manual adjustment. Traditionally, backhaul connection has then been solved by using for example copper wires or optical fiber wires.

However, the traditional backhaul technologies discussed above do not always fit a heterogeneous backhaul scenario. Wireless NLOS backhaul radio links equipped with high gain antennas have then been proposed as an alternative.

High gain radio link antennas with narrow beams are usually used in LOS applications. Aligning such antennas is for example described in WO 2008/047342.

US 2010/0302101 teaches a method of automatic alignment of a first directional beam antenna with a second directional beam antenna at a predetermined path attenuation.

U.S. Pat. No. 6,836,675 teaches a method of achieving best wireless link status of microwave communication system by aiming the antennas at the best direction.

However, none of these documents disclose how to simultaneously align two narrow beam radio link antennas in an NLOS scenario, and there is thus a need for such a method.

SUMMARY

It is an object of the present invention to provide a method for simultaneously aligning two narrow beam radio link antennas in an NLOS scenario.

Said object is obtained by means of a method for alignment of a first node with a second node in a wireless communication network. For a first alignment mode, the method comprises the steps of:

directing a first node first antenna beam at a first pointing direction angle, using a second node antenna beam for scanning a first volume with at least one object between the first node and the second node, said object being able to generate signal reflections and/or signal diffractions with respect to the first node first antenna beam, detecting at least a first signal property of reflected signals and/or diffracted signals, and saving second node antenna beam pointing direction angles resulting in said first signal property exceeding a first threshold level.

For a second alignment mode, the method further comprises the steps:

directing the second node antenna beam at said saved second node antenna beam pointing direction angles, and, for each such pointing direction angle:

using a first node second antenna beam for scanning a second volume; and detecting at least a second signal property of reflected signals and/or diffracted signals.

The method further comprises the steps:

exchanging information between the nodes, said information comprising first node second antenna beam pointing direction angles resulting in said second signal property exceeding a second threshold level and second node antenna beam pointing direction angles resulting in said first signal property exceeding the first threshold level; and selecting a first node antenna beam pointing direction angle and selecting a second node antenna beam pointing direction angle from the antenna beam pointing direction angles comprised in said exchanged information for communication between the first node and the second node.

According to an example, the first node first antenna beam has a wider beamwidth than the first node second antenna beam.

According to another example, the first node first antenna beam has a wider beamwidth than the second node antenna beam.

According to another example, said information comprises measures of said signal property.

According to another example, the method comprises the step of saving the exchanged information, at least at the first node.

More examples are disclosed in the dependent claims.

A number of advantages are obtained by means of the present invention. For example:

No extra equipment is needed.

Deployment is simplified compared to prior methods; alignment is remotely controlled, which reduces time needed for on-site work.

Enabling a self-contained backhaul radio link.

The alignment method is applicable at initial set-up of links as well as during operation.

BRIEF DESCRIPTION OF THE DRAWINGS

The present invention will now be described more in detail with reference to the appended drawings, where.

DETAILED DESCRIPTION

Figure 1:
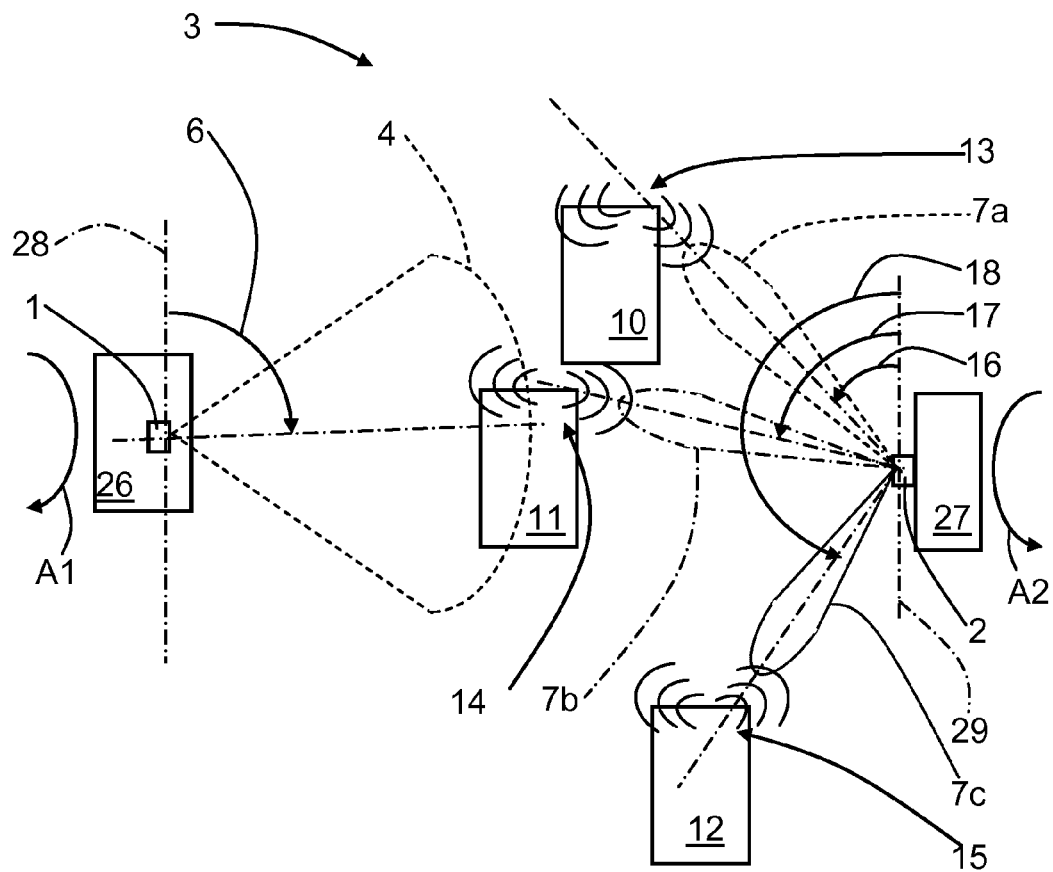
FIG. 1 shows a schematic top view of a wireless communication network with a first node and a second node in a first alignment mode.

With reference to FIG. 1, there is a first node 1 which is positioned on the top of a first building 26 and is comprised in a wireless communication network 3. In this example, the first node 1 is constituted by a backhaul aggregation point at a macro site. The wireless communication network 3 further comprises a second node 2 positioned at a second building 27 such that there is no line-of-sight between the first node 1 and the second node 2. In this example, the second node 2 is positioned closer to a ground level than the first node 1; for example the first node is positioned at a level of 20-30 meters above the ground and the secondary node 2 is positioned at a level of 2-10 meters above the ground.

Furthermore, there is a third building 10, fourth building 11 and fifth building 12 positioned between the first node 1 and the secondary node 2. When signals are transmitted from the nodes, these buildings 10, 11, 12 give rise to signal reflections and/or signal diffractions 13, 14, 15, primarily at the edges of these buildings 10, 11, 12.

The first node 1 comprises an antenna arrangement which is arranged for directing antenna beams with different beamwidths in a first node azimuth direction A1. The second node comprises an antenna arrangement that is steerable in a second azimuth direction A2.

The alignment process, which for example may be run during backhaul installation, can be regarded as having a first alignment mode and a second alignment mode.

The first alignment mode starts with that the first node 1 transmits using a first node first antenna beam 4 directed in a first pointing direction angle 6, where the third building 10, fourth building 11 and fifth building 12 then give rise to the previously mentioned corresponding signal reflections and/or signal diffractions 13, 14, 15. The pointing direction angle 6 is defined relative a first node antenna plane 28.

Then, according to the present invention, the first secondary node 2 uses a second node antenna beam 7a, 7b, 7c in reception for performing a first scan by scanning a first volume, where the first scan either is performed mechanically or electronically. The second node antenna beam 7a, 7b, 7c is in FIG. 1 shown at three different first scan pointing direction angles 16, 17, 18. As for the first node, the pointing direction angles are defined relative a second node antenna plane 29.

The first node first antenna beam 4 is a relatively wide beam in the first azimuth direction A1, and the secondary node uses a relatively narrow beam in the second azimuth direction A2, as schematically indicated in FIG. 1. For example, a typical half-power beamwidth of the first node first antenna beam 4 is of the magnitude 60 degrees and a typical half-power beamwidth of the second node antenna beam 7a, 7b, 7c is of the magnitude 5 degrees The first node first antenna beam 4 illuminates a plurality of reflection/diffraction points in the direction of the secondary node, including the reflections and/or signal diffractions 13, 14, 15 mentioned above.

During the first scan of the second node antenna beam 7a, 7b, 7c, the signal levels are detected, and in the environment disclosed in this example, the main signals are the reflected signals and/or diffracted signals 13, 14, 15. During the first scan, the second node antenna beam pointing direction angles 16, 17, 18 that result in signal levels exceeding a first threshold are recorded and stored. The first scan continues until no further diffraction/reflection points are found with a signal level above the first threshold level.

Figure 2:
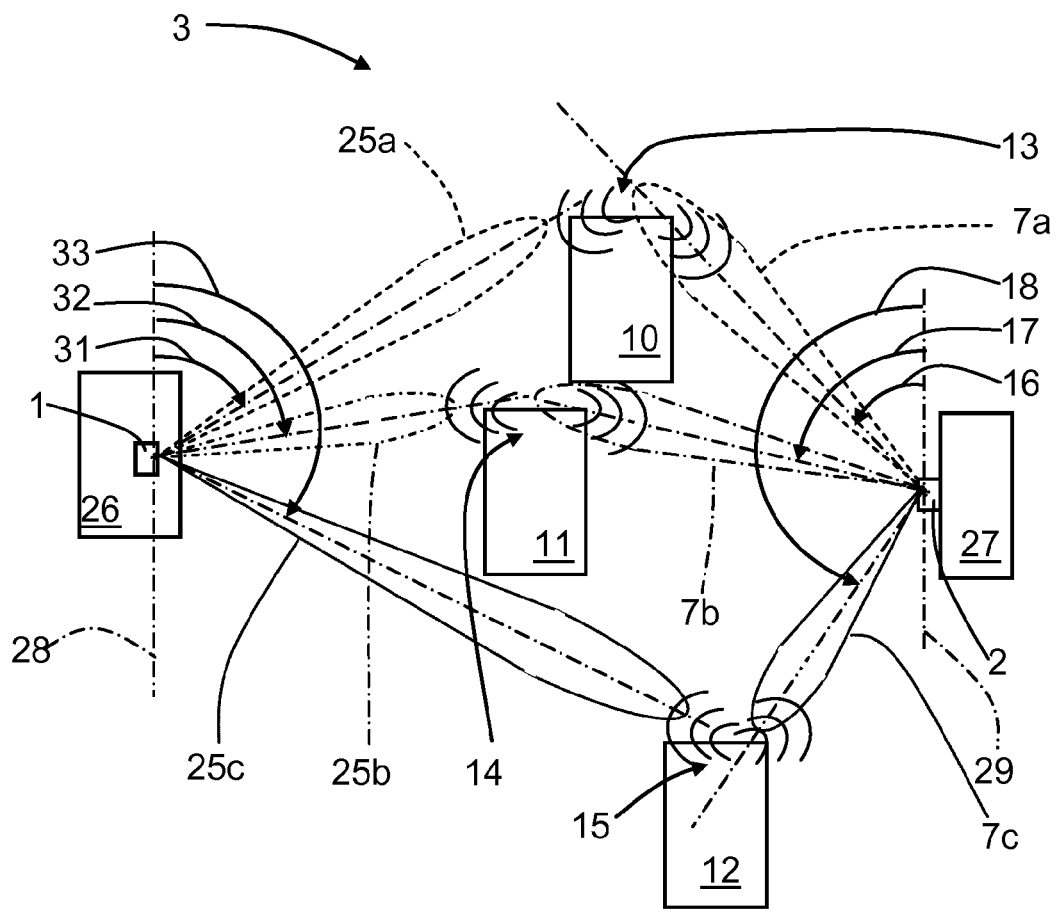
FIG. 2 shows a schematic top view of a wireless communication network with a first node and a second node in a second alignment mode.

With reference to FIG. 2, now the second alignment mode starts, where the second node antenna beam 7a, 7b, 7c is directed at said stored second node antenna beam pointing direction angles 16, 17, 18 that previously resulted in signal levels exceeding the first threshold, one at a time, the second node antenna beam 7a, 7b, 7c now being transmitting.

For each of these stored second node antenna beam pointing direction angles 16, 17, 18, a first node second antenna beam 25a, 25b, 25c is used for performing a second scan by scanning a second volume in reception. The first node second antenna beam 25a, 25b, 25c is relatively narrow in the first azimuth direction A1, having about the same beamwidth as the second node antenna beam 7a, 7b, 7c.

During the second scan, the signal levels are detected, and in the environment disclosed in this example, the main signals are again the reflected signals and/or diffracted signals 13, 14, 15. During the second scan, the first node second antenna beam pointing direction angles 31, 32, 33 that result in signal levels exceeding a second threshold are recorded and stored. The second scan continues for each one of the stored second node antenna beam pointing direction angles 16, 17, 18 until no further diffraction/reflection points are found with a signal level above the second threshold level.

Information regarding the found diffraction/reflection points, i.e. information regarding the found signal paths, is exchanged between the two nodes 1, 2. The information comprises first node second antenna beam pointing direction angles 31, 32, 33 resulting in signal levels exceeding a second threshold level and second node antenna beam pointing direction angles 16, 17, 18 resulting in signal levels exceeding the first threshold level.

The information preferably also comprises the signal levels that are detected at the pointing direction angles 16, 17, 18; 31, 32, 33. For example, for each certain first node second antenna beam pointing direction angle that in combination with a certain second node antenna beam pointing direction angle that results in signal levels exceeding the thresholds, the information comprises these angles together with the resulting signal level.

The alignment process is then completed and the backhaul communication starts with data transmission between the nodes 2, 3 using narrow beams at both nodes pointing in the direction of a diffraction/reflection point with high signal strength recorded and stored during the alignment process.

This means that a first node antenna beam pointing direction angle 31, 32, 33 and a second node antenna beam pointing direction angle 16, 17, 18 are selected from the antenna beam pointing direction angles 16, 17, 18; 31, 32, 33 comprised in said exchanged information for communication between the first node 1 and the second node 2.

Figure 3:
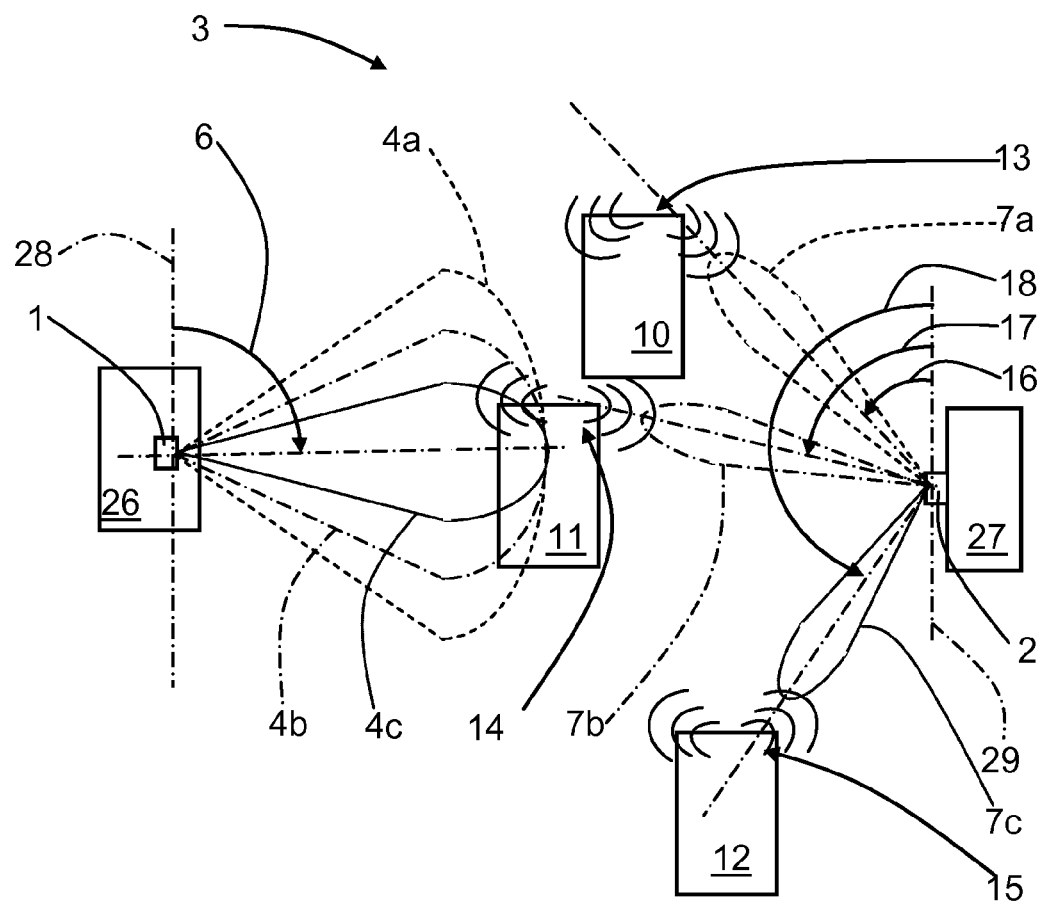
FIG. 3 shows a schematic top view of a wireless communication network with a first node and a second node according to an alternative.

With reference to FIG. 3, the first node first antenna beam 4 may be reconfigurable and comprises a plurality of first node antenna sub-beams 4a, 4b, 4c of subsequently narrowing beamwidth. The beamwidth of the first node's antenna beam is thus stepwise narrowed during the first alignment mode until minimum beamwidth is reached.

Alternatively, first node first antenna beam may be reconfigurable according to the above, but and instead of sub-beams with a beamwidth that decreases in steps, the first node antenna beam has a steplessly adjustable beamwidth The first node first antenna beam's beamwidth may then be steplessly narrowed during the first alignment mode until minimum beamwidth is reached.

Coarse alignment of the antenna beams during installation can be performed using:
  Visual inspection of the scenario to find a probable diffraction/reflection point;
  Means mounted on the antennas to transmit a light or laser beam towards a probable diffraction/reflection point visible from both nodes; and/or
  Using known positions of the first node and the secondary node to calculate beam directions towards a probable common diffraction/reflection point.

The alignment can for example be:
  Automatic by setting the equipment in an alignment mode during installation that switches to an operation mode when alignment is completed; and/or
  Supported by a communication link via the wireless communication network 3 or other available means such as the cellular network.

The term "signal level" that has been used above is an example. Many other parameters than signal level can be monitored during the alignment process for example:
  Bit-error rate (BER);
  Signal to noise and interference ratio (SNIR);
  Signal to interference ratio (SIR);
  Signal to noise ratio (SNR);
  Block Error Rate (BLER);
  Re-transmission frequency;
  Channel Quality Indicator (CQI); and/or
  Received Signal Strength Indicator (RSSI).

Generally, the parameters above constitute signal properties, and in the method according to the present invention, at least one signal property is detected at a time. During the first scan, at least a first signal property is detected, and during the second scan, at least a second signal property is detected. Said first and second signal properties may be of the same type, or different. Each threshold level is adapted for the signal property in question.

The two antenna beams of different beamwidths can be implemented in a number of ways:
  A small portion of the antenna aperture is used to generate a wide beam while the whole antenna aperture is used for the narrow beam; or
  Interleaved low and high frequency band antennas in the same aperture generating a wide and narrow beam, respectively.

The reconfigurable antenna beam can be reconfigurable between different beamwidths in different levels of complexity:
  Two different beamwidths (wide and narrow);
  Several different beamwidths, where during the signal path search, narrower and narrower beamwidths are used giving finer and finer accuracy of the directions; or
  Steplessly varying beamwidth, where during the signal path search, narrower and narrower beamwidths are used giving finer and finer accuracy of the directions.

The wide beam can be:
  Wide in two orthogonal planes; or
  Wide in one fixed or switchable plane and narrow in an orthogonal plane The signal level in the communication links during alignment may be improved by
  Changing the polarization;
  Changing the bandwidth and the center frequency used; and/or
  Coded and modulated appropriately.

Where narrow antenna beams are used, they can be either steered or switched.

The invention relates to a self-alignment procedure to connect radio link antennas for backhaul communication in an NLOS scenario. This may for example be accomplished by using an alignment indicator such as a receive power meter. The radio link backhaul antennas at both the first base station and the second base station are then pointed towards common reflection/diffraction points using a broad antenna beam at one of the base stations for coarse alignment. When a radio link connection is established, the wide beam is replaced by a high gain antenna beam used for final alignment during installation. In addition, the acquired backhaul antenna beam directions at the first and second base stations are stored.

Figure 4:
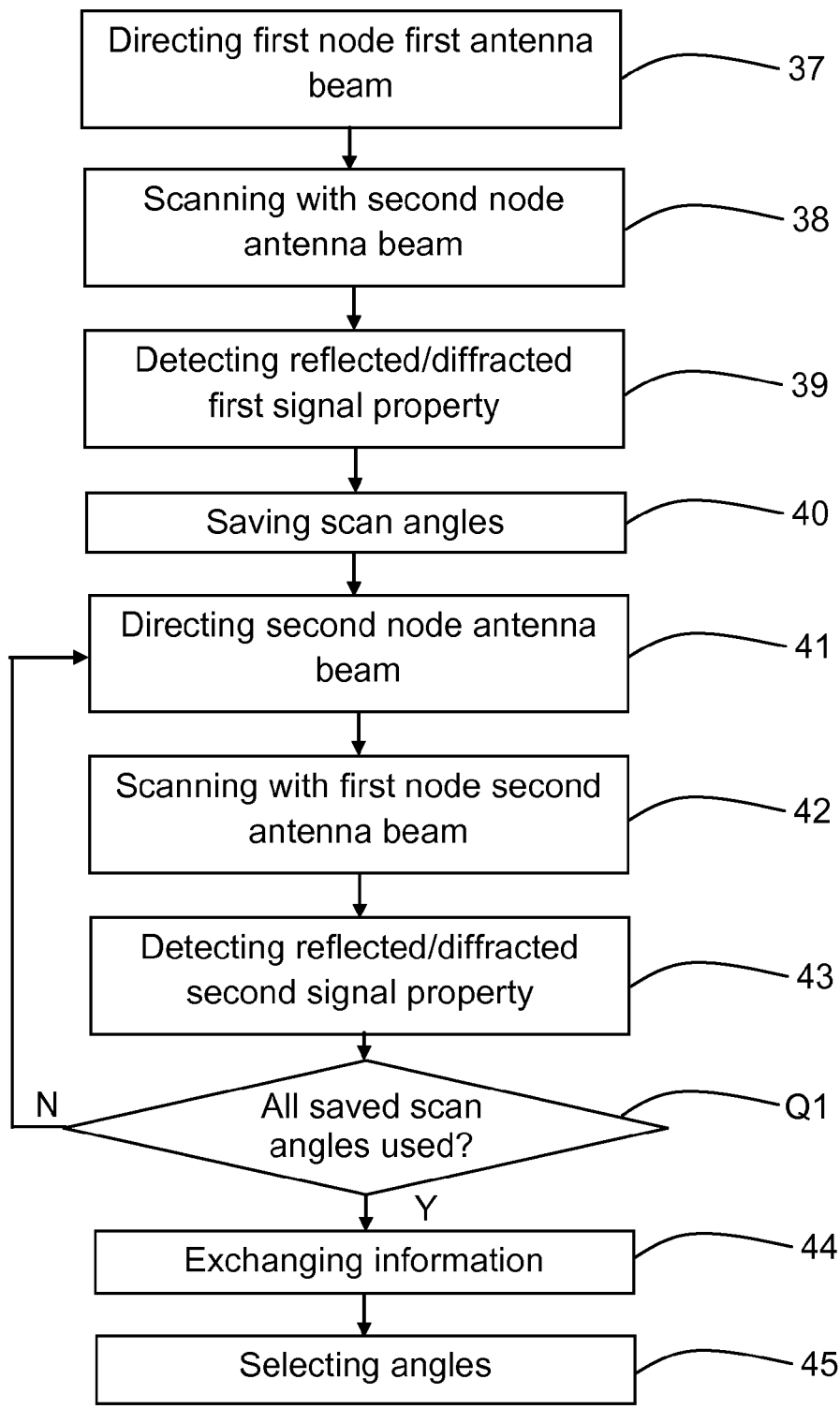
FIG. 4 shows a flow chart of a method according to the present invention.

Generally, with reference to FIG. 1, FIG. 2 and FIG. 4, the present invention relates to a method for alignment of a first node 1 with a second node 2 in a wireless communication network 3. For a first alignment mode, the method comprises the steps:

37: directing a first node first antenna beam (4) at a first pointing direction angle (6);

38: using a second node antenna beam 7a, 7b, 7c for scanning a first volume with at least one object 10, 11, 12 between the first node 1 and the second node 2, said object 10, 11, 12 being able to generate signal reflections and/or signal diffractions 13, 14, 15 with respect to the first node first antenna beam (4);

39: detecting at least a first signal property of reflected signals and/or diffracted signals 21, 22, 23; and

40: saving second node antenna beam pointing direction angles 16, 17, 18 resulting in said first signal property exceeding a first threshold level.

For a second alignment mode, following the first alignment mode, the method further comprises the steps:

41: directing the second node antenna beam 7a, 7b, 7c at said saved second node antenna beam pointing direction angles 16, 17, 18, and, for each Q1 such pointing direction angle:

42: using a first node second antenna beam 25a, 25b, 25c for scanning a second volume; and

43: detecting at least a second signal property of reflected signals and/or diffracted signals 13, 14, 15.

The method further comprises the steps:

44: exchanging information between the nodes 1, 2, said information comprising first node second antenna beam pointing direction angles 31, 32, 33 resulting in said second signal property exceeding a second threshold level and second node antenna beam pointing direction angles 16, 17, 18 resulting in said first signal property exceeding the first threshold level; and

45: selecting a first node antenna beam pointing direction angle 31, 32, 33 and selecting a second node antenna beam pointing direction angle 16, 17, 18 from the antenna beam pointing direction angles 16, 17, 18; 31, 32, 33 comprised in said exchanged information for communication between the first node 1 and the second node 2.

Of the last two method steps 44, 45, the first 44 may be performed at one or several occasions during running the previous method steps, for each saved second node antenna beam pointing direction angles 16, 17, 18, or when all saved second node antenna beam pointing direction angles 16, 17, 18 have been completed. The latter of these examples is illustrated in FIG. 4.

Of the last two method steps 44, 45, the last 45 is performed when communication between the nodes 1, 2 is started, using the results from the previous method steps 37, 38, 39, 40, 41, 42, 43, 44.

The present invention is not limited to the above, but may vary within the scope of the appended claims. For example, which node that is transmitting and which node that is receiving during the alignment may be switched to any suitable configuration.

When terms like orthogonal and the like are used, these terms are not to be interpreted as mathematically exact, but within what is practically obtainable.

The second node may be any sort of node, but may mainly be constituted by a smaller type of base station such as a so-called pico base station or similar. There may be any number of second nodes, and the method may be performed for each of these as desired.

The first node 1 is in the example constituted by a backhaul aggregation point at a macro site. The first node may be any sort of node, where the present invention generally refers to antenna alignment between any two nodes. The present invention does not require non line-of-sight for all antenna beams, but also works for antenna beams in the wireless communication network 3 where line-of-sight exists.

Each antenna beam pointing direction angle 16, 17, 18; 31, 32, 33 comprised in said exchanged information is identified either by a specific angular measure or by an identification reference such as a letter or a digit.

The present invention is not limited to searching in the azimuth plane only but can also be extended to searching in both azimuth and elevation planes.

It is conceivable that the second node antenna beam (7a, 7b, 7c) has an adjustable beamwidth.

The invention claimed is:

1. A method for alignment of a first node with a second node in a wireless communication network, the method comprises:
    pointing a first node wide antenna beam at a first pointing direction angle;
    while the first node wide antenna beam is pointed at the first pointing direction angle, pointing a second node narrow antenna beam in a second pointing direction angle;
    while the second node narrow antenna beam is pointed in the second pointing direction angle, detecting a first signal strength above a predetermined threshold;
    while the first node wide antenna beam is pointed at the first pointing direction angle, pointing the second node narrow antenna beam in a third pointing direction angle;
    while the second node narrow antenna beam is pointed in the third pointing direction angle, detecting a second signal strength above the predetermined threshold;
    while the first node wide antenna beam is pointed at the first pointing direction angle, pointing the second node narrow antenna beam in a fourth pointing direction angle;
    while the second node narrow antenna beam is pointed in the fourth pointing direction angle, detecting a third signal strength below the predetermined threshold;
    storing the second pointing direction angle as a result of the first signal strength being above the predetermined threshold;
    storing the third pointing direction angle as a result of the second signal strength being above the predetermined threshold;
    pointing the second node narrow antenna beam in the stored second pointing direction angle as a result of the first signal strength being above the predetermined threshold;
    while the second narrow antenna beam is pointed in the stored second pointing direction angle, pointing a first node narrow antenna beam in a fifth pointing direction angle;
    while the first node narrow antenna beam is pointed in the fifth pointing direction angle, detecting a fourth signal strength above the predetermined threshold;
    pointing the second node narrow antenna beam in the stored third pointing direction angle as a result of the second signal strength being above the predetermined threshold;
    while the second node narrow antenna beam is pointed in the stored third pointing direction angle, pointing the first node narrow antenna beam in a sixth pointing direction angle;
    while the first node narrow antenna beam is pointed in the sixth pointing direction angle, detecting a fifth signal strength above the predetermined threshold;
    storing the fifth pointing direction angle as a result of the fourth signal strength being above the predetermined threshold;
    storing the sixth pointing direction angle as a result of the fifth signal strength being above the predetermined threshold;
    exchanging information between the nodes, the exchanged information comprising the stored pointing direction angles; and
    selecting a first node antenna beam pointing direction angle and selecting a second node antenna beam pointing direction angle based on the exchanged information for communication between the first node and the second node.

2. The method according to claim 1, wherein the first node wide antenna beam is reconfigurable and comprises a plurality of first node antenna sub-beams of subsequently narrowing beamwidth, the first node wide antenna beam configured to be stepwise narrowed until a minimum beamwidth is reached.

3. The method according to claim 1, wherein the first node wide antenna beam is reconfigurable and comprises a first node antenna beam with adjustable beamwidth.

4. The method according to claim 1, wherein the exchanged information comprises the signal strength associated to each pointing direction angle.

5. The method according to claim 1, wherein the detected signal strength includes at least one of relative signal strength, Signal to interference ratio, SIR, Signal to noise and interference ratio, SNIR, Signal to noise ratio, SNR, Bit Error Rate, BER, Block Error Rate BLER, Channel Quality Indicator, CQI, Received Signal Strength Indication, RSSI and re-transmission frequency.

6. The method according to claim 1, wherein the method further comprises saving the exchanged information, at least at the first node.

7. The method according to claim 1, wherein each stored pointing direction angle in the exchanged information is identified by at least one of: specific angular measure and identification reference.

* * * * *